United States Patent
Mahajan et al.

(10) Patent No.: US 12,196,615 B2
(45) Date of Patent: Jan. 14, 2025

(54) METHOD AND APPARATUS FOR OBTAINING CHEMICAL AND/OR MATERIAL SPECIFIC INFORMATION OF A SAMPLE USING LIGHT SCATTERED BY RAYLEIGH SCATTERING AND/OR RAMAN SCATTERING

(71) Applicant: University of Southampton, Southampton (GB)

(72) Inventors: Sumeet Mahajan, Southampton (GB); Niall Hanrahan, Southampton (GB); Konstaninos Bourdakos, Southampton (GB); Simon Lane, Southampton (GB)

(73) Assignee: UNIVERSITY OF SOUTHAMPTON, Southampton (GB)

( * ) Notice: Subject to any disclaimer, the term of this patent is extended or adjusted under 35 U.S.C. 154(b) by 199 days.

(21) Appl. No.: 17/800,093

(22) PCT Filed: Feb. 16, 2021

(86) PCT No.: PCT/GB2021/050370
§ 371 (c)(1),
(2) Date: Aug. 16, 2022

(87) PCT Pub. No.: WO2021/165661
PCT Pub. Date: Aug. 26, 2021

(65) Prior Publication Data
US 2023/0093989 A1    Mar. 30, 2023

(30) Foreign Application Priority Data

Feb. 17, 2020  (EP) .................................. 20386010
Mar. 17, 2020  (GB) .................................. 2003856

(51) Int. Cl.
| | | |
|---|---|---|
| G01J 3/433 | (2006.01) | |
| G01J 3/02 | (2006.01) | |
| G01J 3/44 | (2006.01) | |
| G01N 21/21 | (2006.01) | |

(Continued)

(52) U.S. Cl.
CPC ............. *G01J 3/433* (2013.01); *G01J 3/0224* (2013.01); *G01J 3/4412* (2013.01); *G01N 21/21* (2013.01); *G01N 21/47* (2013.01); *G01N 21/65* (2013.01)

(58) Field of Classification Search
CPC ........ G01J 3/433; G01J 3/0224; G01J 3/4412; G01J 2003/4332; G01J 3/4338; G01J 3/44;

(Continued)

(56) References Cited

U.S. PATENT DOCUMENTS 5,713,364 A * 2/1998 DeBaryshe ........ G01N 21/4795
600/407
5,813,987 A * 9/1998 Modell ................ A61B 5/0062
600/476

(Continued)

OTHER PUBLICATIONS

Ko et al., "Early dental caries detection using a fibre-optic coupled polarization-resolved Raman spectroscopic system References and links", Opt. Express 16, 6274-6284 (2008).

*Primary Examiner* — Mohamed K Amara
(74) *Attorney, Agent, or Firm* — Volpe Koenig

(57) ABSTRACT

A method for obtaining chemical and/or material specific information of a sample based on scattered light. The method comprises receiving detection data comprising at least two images. Each image is indicative of the intensity of scattered light i) for incident light of a different wavelength, or ii) for incident light of a different polarization state, or iii) of a different polarization state. The scattered light comprises an elastic scattering component that is due to Rayleigh scattering of the incident light in at least a portion of the sample. Alternatively, each image is indicative of the intensity of scattered light i) of a different wavelength, or ii) for incident light of a different polarization state, or iii) of a different polarization state, wherein the scattered light com- (Continued)

Figure 1:
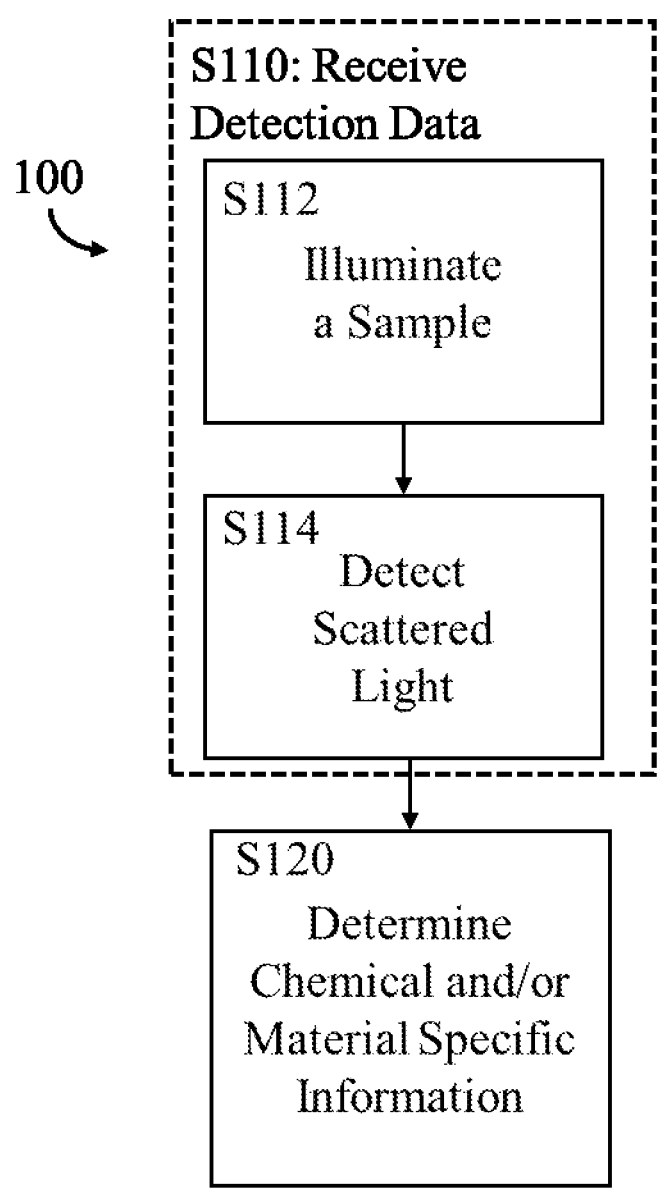

prises an inelastic scattering component that is due to Raman scattering of the incident light in at least a portion of the sample. The method further comprises determining the chemical and/or material specific information of the sample based on the change in intensity of the elastic scattering component in dependence on the change in wavelength and/or the change in polarization state of the incident and/or scattered light.

20 Claims, 3 Drawing Sheets

(51) Int. Cl.
*G01N 21/47* (2006.01)
*G01N 21/65* (2006.01)

(58) Field of Classification Search
CPC ........ G01N 21/21; G01N 21/47; G01N 21/65; G01N 2021/216; G01N 2021/4792; G01N 21/4795; G01N 2021/4733; G02B 21/0032; G02B 21/0076; G02B 21/361; G02B 21/367
See application file for complete search history.

(56) References Cited

U.S. PATENT DOCUMENTS

| | | | |
|---|---|---|---|
| 6,495,833 B1 | 12/2002 | Alfano et al. | |
| 7,945,077 B2* | 5/2011 | Demos | A61B 5/0071 382/128 |
| RE42,641 E * | 8/2011 | Izatt | G01B 9/02069 356/497 |
| 8,575,570 B2* | 11/2013 | Choi | G02B 21/367 359/368 |
| 10,151,634 B2* | 12/2018 | Abdulhalim | G01J 3/26 |
| 10,551,305 B2* | 2/2020 | Lambert | G01N 33/2829 |
| 10,732,092 B2* | 8/2020 | Scarcelli | C12Q 1/00 |
| 11,193,886 B2* | 12/2021 | Ntziachristos | G01N 21/1702 |
| 2005/0030533 A1* | 2/2005 | Treado | G01J 3/10 356/519 |
| 2006/0011804 A1* | 1/2006 | Engelmann | G02B 21/008 250/201.3 |
| 2006/0124443 A1* | 6/2006 | Tuschel | G11B 7/245 204/157.92 |
| 2009/0028503 A1* | 1/2009 | Garrett | G02B 6/3594 385/18 |
| 2009/0119808 A1* | 5/2009 | Giakos | G01J 4/04 977/953 |
| 2011/0122488 A1* | 5/2011 | Truong | G02B 21/367 359/385 |
| 2012/0049087 A1* | 3/2012 | Choi | G01N 21/4795 250/459.1 |
| 2013/0149734 A1* | 6/2013 | Ammar | G01N 21/6486 356/73 |
| 2017/0363472 A1* | 12/2017 | Abdulhalim | G02F 1/1393 |
| 2018/0292323 A1* | 10/2018 | Schütze | G01J 3/44 |
| 2022/0042916 A1* | 2/2022 | Notingher | G02B 21/16 |
| 2022/0378295 A1* | 12/2022 | Freiden | A61B 5/0075 |

* cited by examiner

METHOD AND APPARATUS FOR OBTAINING CHEMICAL AND/OR MATERIAL SPECIFIC INFORMATION OF A SAMPLE USING LIGHT SCATTERED BY RAYLEIGH SCATTERING AND/OR RAMAN SCATTERING

The present invention relates to a method and an apparatus for obtaining chemical and/or material specific information of a sample using light scattered by Rayleigh scattering and/or Raman scattering.

The majority of current methods for obtaining chemical and/or material specific information in biological and medical imaging rely on labelling or staining a sample with an exogenous labelling or staining agent, such as a fluorophore. Such labelling or staining is an invasive process that can affect the sample, and lead to problems such as photo-bleaching and photo-toxicity in biological samples.

There is thus a need for methods and apparatuses for obtaining chemical and/or material specific information of a sample without relying on the introduction of labelling or staining agents into the sample.

According to an aspect of the invention, there is provided a method for obtaining chemical and/or material specific information of a sample based on scattered light. The method comprises receiving detection data comprising at least two images, wherein each image is indicative of the intensity of scattered light i) for incident light of a different wavelength, or ii) for incident light of a different polarization state, or iii) of a different polarization state. The scattered light comprises an elastic scattering component that is due to Rayleigh scattering of the incident light in at least a portion of the sample. The method further comprises determining the chemical and/or material specific information of the sample based on the change in intensity of the elastic scattering component in dependence on the change in wavelength and/or the change in polarization state of the incident and/or scattered light.

According to a further aspect of the invention, there is provided a method for obtaining chemical and/or material specific information of a sample based on scattered light. The method comprises receiving detection data comprising at least two images, wherein each image is indicative of the intensity of scattered light i) of a different wavelength, or ii) for incident light of a different polarization state, or iii) of a different polarization state. The scattered light comprises an inelastic scattering component that is due to Raman scattering of the incident light in at least a portion of the sample. The method further comprises determining the chemical and/or material specific information of the sample based on the change in intensity of the inelastic scattering component in dependence on the change in wavelength and/or the change in polarization state of the incident and/or scattered light.

According to a further aspect of the invention, there is provided an imaging apparatus for obtaining chemical and/or material specific information of a sample based on scattered light. The imaging apparatus comprises one or more illumination devices configured to illuminate at least a portion of the sample with incident light, and one or more detection devices configured to detect at least two images indicative of the intensity of scattered light comprising an elastic scattering component that is due to Rayleigh scattering of the incident light in the portion of the sample. For each image i) the one or more illumination devices are configured to provide incident light of a different wavelength and/or the polarization state, or ii) the one or more detection devices are configured to detect scattered light of a different polarization state. The imaging apparatus further comprises a processor in data communication with the one or more detection devices and configured to determine the chemical and/or material specific information of the sample based on the change in intensity of the elastic scattering component in dependence on the change in wavelength and/or the change in polarization state of the incident and/or scattered light.

According to a further aspect of the invention, there is provided an imaging apparatus for obtaining chemical and/or material specific information of a sample based on scattered light. The imaging apparatus comprises one or more illumination devices configured to illuminate at least a portion of the sample with incident light, and one or more detection devices configured to detect at least two images indicative of the intensity of scattered light comprising an inelastic scattering component that is due to Raman scattering of the incident light in the portion of the sample. For each image i) the one or more illumination devices are configured to provide incident light of a different polarization state, or ii) the one or more detection devices are configured to detect scattered light of a different polarization state and/or wavelength. The imaging apparatus further comprises a processor in data communication with the one or more detection devices and configured to determine the chemical and/or material specific information of the sample based on the change in intensity of the inelastic scattering component in dependence on the change in wavelength and/or the change in polarization state of the incident and/or scattered light.

Figure 2:
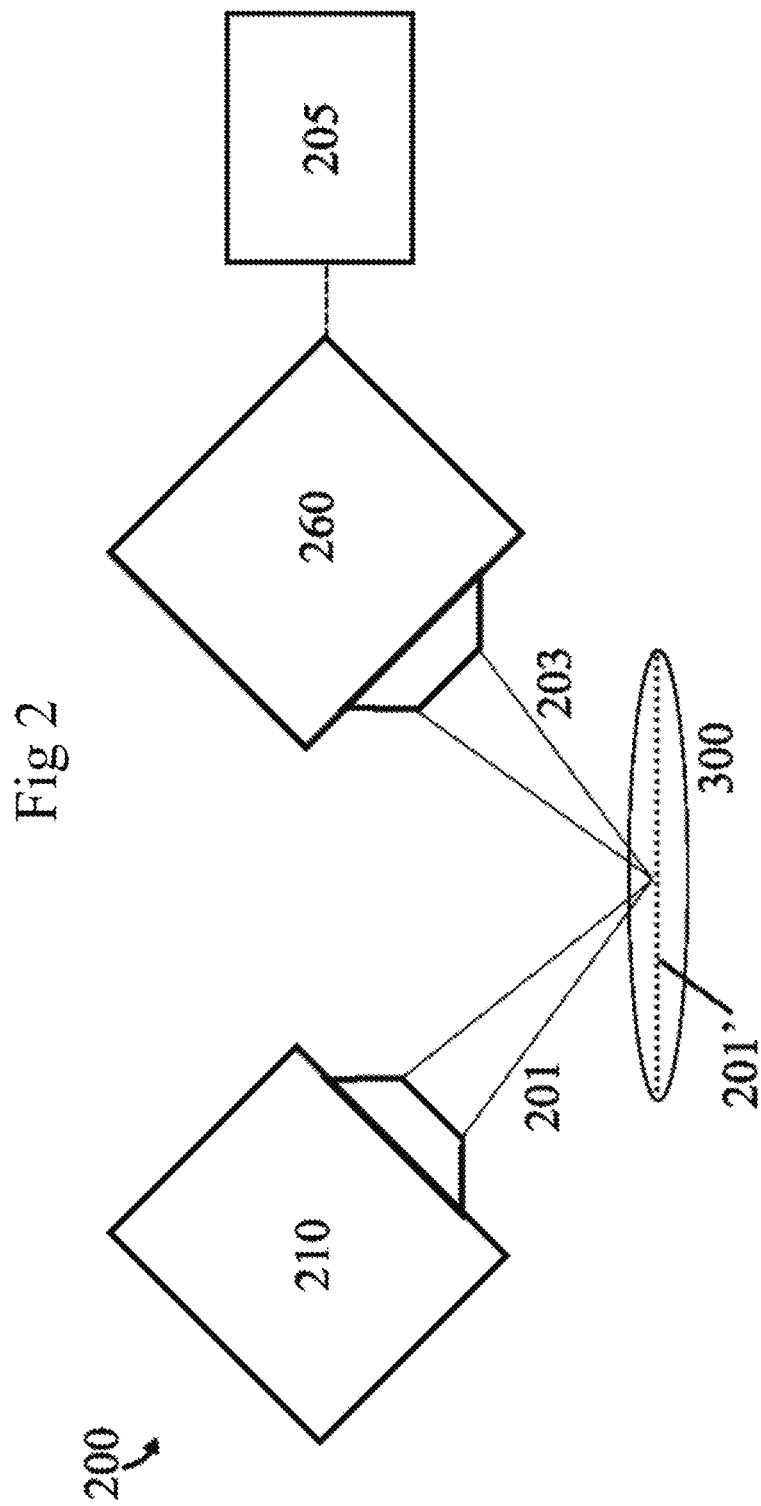
Figure 3:
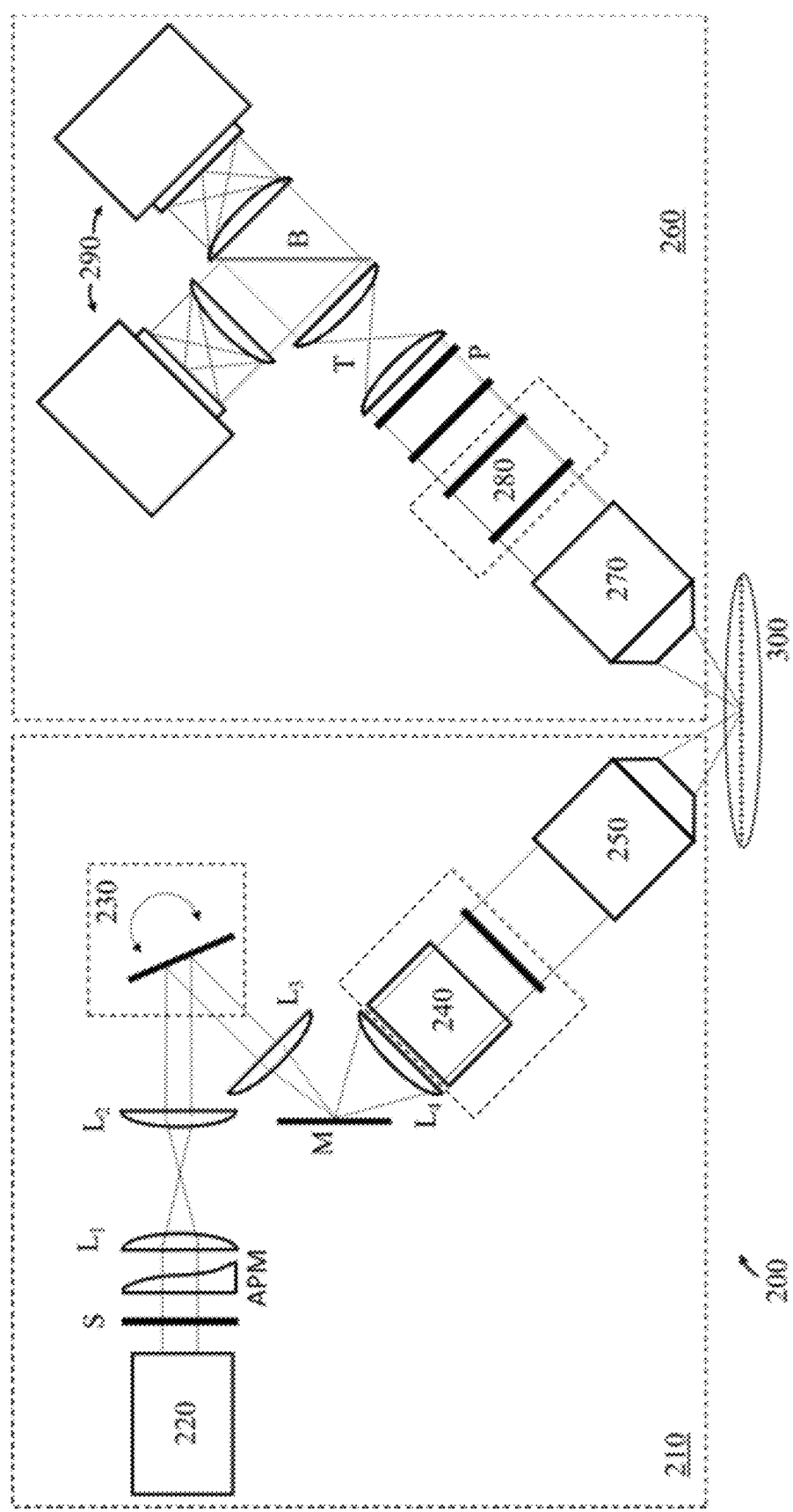

The invention will be more clearly understood from the following description, given by way of example only, with reference to the accompanying drawings, in which:

FIG. 1 schematically depicts a method for obtaining chemical and/or material specific information of a sample based on scattered light;

FIG. 2 schematically depicts an embodiment of an imaging apparatus for obtaining chemical and/or material specific information of a sample based on scattered light; and FIG. 3 schematically depicts a detailed embodiment of an imaging apparatus for obtaining chemical and/or material specific information of a sample based on scattered light.

The same references are used for similar features throughout the drawings. The features shown in the figures are not necessarily to scale and the size or arrangements depicted are not limiting. It will be understood that the figures may include optional features which are not essential to any embodiments. Furthermore, not all of the features are depicted in each figure and the figures may only show a few of the components relevant for a describing a particular feature.

A major issue facing the field of medical and biological imaging is how to determine chemical and/or material specific information of a sample without introducing exogenous labelling or staining agents into the sample.

The scattering of light that is incident on a sample (herein referred to as "incident light") may be used in microscopy to obtain structural and/or morphological and/or compositional information about the sample. The incident light is scattered by the sample, thereby creating scattered light. Scattering of light includes elastic scattering (such as Rayleigh and Mie scattering), in which the energy (and so the wavelength) of the incident light remains unchanged, and inelastic scattering (such as Raman scattering), in which some of the energy of the incident light is lost or increased. Scattered light may thus include a Rayleigh component at the same wavelength as the incident light, a Raman component at a wavelength lower or higher than the wavelength of the incident light, and other scattering components at the same or different wavelengths than incident light (e.g. a Mie component, among others).

The intensity of light scattered by Rayleigh or Raman scattering is dependent on the polarization state of the incident light on a sample. The intensity of light scattered by Rayleigh or Raman scattering is also dependent on the wavelength of the incident light on the sample. The inventors have surprisingly found that this polarization dependence of Rayleigh or Raman scattering is in turn dependent on the wavelength of incident light. The inventors have also found that i) the wavelength dependence, ii) the polarization state dependence, and iii) the wavelength dependence of the polarization dependence of both Rayleigh and Raman scattering differs for different chemicals and/or materials. In other words, each chemical and/or material has a specific wavelength-polarization signature for Rayleigh and Raman scattering. By contrast, the intensity of light scattered by Mie scattering is not dependent on the polarization state and/or wavelength of the incident light on the sample. The present invention relies on exploiting this newly found wavelength-polarization signature in order to determine chemical and/or material specific information of a sample. The invention allows the Mie component to be ignored when determining the chemical and/or material specific information, due to the lack of a wavelength and/or polarization state dependence of the Mie component.

FIG. 1 depicts an embodiment of a method 100 for obtaining chemical and/or material specific information of a sample 300 based on scattered light 203. The method 100 may be a computer-implemented method 100. The method 100 may be carried out by a computing device or processor 205, or by an imaging apparatus 200 comprising a computing device or processor 205.

The method 100 comprises a step S110 of receiving or obtaining detection data. The detection data comprises at least two images. The at least two images may be 2-dimensional images of the sample 300. The detection data may be received or obtained from an imaging apparatus 200, such as the imaging apparatus 200 of FIG. 2 or FIG. 3. Alternatively, the detection data may be received from a storage device that stores the detection data. Each image is indicative of the intensity of scattered light 203, where the scattered light 203 is due to scattering of incident light 201 in at least a portion of the sample 300. Each image is obtained at a different condition of the incident light 201 and/or the scattered light 203, such that each image is indicative of the intensity of the scattered light 203 for a different condition of the incident light 201 and/or the scattered light 203.

In the following, a different condition of the incident light 201 and/or the scattered light 203 means a different wavelength and/or polarization state of the incident light 201 and/or the scattered light 203. Receiving or obtaining the at least two images at different conditions means that a first image is obtained at a first condition, i.e. at a first wavelength and/or polarization state of the incident light 201 and/or the scattered light 203, and that a second image is obtained at a second condition, i.e. at a second wavelength and/or polarization state of the incident light 201 and/or the scattered light 203, wherein the first wavelength and/or polarization state is different from the second wavelength and/or polarization state. As such, each image may be indicative of the intensity of the scattered light 203 for a different combination of wavelength and/or polarization state of the incident light 201 and/or the scattered light 203.

The polarization state may be a linear polarization state (i.e. the incident light 201 and/or the scattered light 203 may be linearly polarized), such that the different polarization states are different polarization angles. Alternatively, the polarization state may be any other polarization state, such as a circular or elliptical polarization state, or a radial or azimuthal polarization state, or any combination of linear polarization states in one or more dimensions (x, y, z in Cartesian coordinates, or r and θ in polar coordinates). For example, the two different polarization states may be two orthogonal polarization states, or left- and right-handed circular polarization states. Incident light 201 of two orthogonal polarization states may comprise incident light 201 with an electric field component that is parallel to/perpendicular to a plane of the sample 300 that is illuminated. Scattered light 203 of two orthogonal polarization states may comprise a polarization state oriented parallel to/perpendicular to a direction in which the incident light 201 is scanned across the sample 300.

The method 100 further comprises a step S120 of determining the chemical and/or material specific information of the sample 300 based on the change in intensity of the elastic and/or inelastic scattering component in dependence on the change in wavelength and/or the change in polarization state of the incident and/or scattered light. Due to the inventors' realization that i) the wavelength dependence, ii) the polarization state dependence, and/or iii) the wavelength dependence of the polarization dependence of Rayleigh and/or Raman scattering differs and is characteristic for different chemicals and/or materials, it is possible to derive the chemical and/or material specific information of the sample 300 from this i) wavelength dependence, ii) polarization state dependence, and/or iii) wavelength dependence of the polarization dependence of Rayleigh and/or Raman scattering. The chemical and/or material specific information may be any information that is specific to the chemical make-up, material or composition of the sample 300, so may be any information that is not dependent on the morphology, topology or structure of the sample 300.

FIG. 2 shows an embodiment of an imaging apparatus 200. FIG. 3 shows a more detailed embodiment of the imaging apparatus 200. The imaging apparatus 200 may obtain the detection data comprising the at least two images. The imaging apparatus 200 may be for determining the chemical and/or material specific information of the sample 300 based on the scattered light 203. The imaging apparatus 200 comprises one or more illumination devices 210. The one or more illumination devices 210 may illuminate at least a portion of the sample 300 with the incident light 201. The sample 300 may scatter the incident light 201 so as to create the scattered light 203. The sample 300 may, for example, be a biological sample, such as one or more biological cells (e.g. mammalian cells), drugs, model organisms, cleared tissue and various components within these examples. The sample 300 may be transparent or translucent. The imaging apparatus 200 comprises one or more detection devices 260. The one or more detection devices 260 may detect the scattered light, so as to obtain the detection data. The one or more detection devices 260 may detect the at least two images (or the at least four images) received in step S110 of the method 100. The imaging apparatus 200 comprises a processor 205. The processor 205 is in data communication with the one or more detection devices 260. The processor 205 determines the chemical and/or material specific information of the sample 300. The processor 205 may receive the detection data from the one or more detection devices 260, and process the detection data so as to determine the chemical and/or material specific information of the sample 300. The processor 205 may carry out the method 100.

Rayleigh Scattering and/or Raman Scattering

The method 100 comprises the step S110 of receiving detection data comprising at least two images, each image being indicative of the intensity of the scattered light 203.

In a first embodiment, the scattered light 203 comprises an elastic scattering component that is due to Rayleigh scattering of the incident light 201 in at least a portion of the sample 300. The elastic scattering component may be preferentially selected from all light scattered by the sample 300, for example using a wavelength filter that preferentially selects light having the same wavelength as the incident light 201. The wavelength of the elastic scattering component of the scattered light 203 will be the same as the wavelength of the incident light 201. For this purpose, the one or more detection devices 260 of the imaging apparatus 200 may comprise a wavelength filter for preferentially selecting the scattered light 203 having the same wavelength as the incident light 201. The wavelength filter may be a tunable wavelength filter, so as to allow adjustment of the wavelength of the scattered light 203 that is detected by the one or more detection devices 260, for example in unison with any adjustment of the wavelength of the incident light 201. Alternatively, the at least two images are created based on the scattered light 203 of any wavelength. The elastic scattering component of the scattered light 203 is expected to dominate the intensity of the scattered light 203, i.e. the elastic scattering component is expected to be much greater than any inelastic scattering component. As such, the intensity of the scattered light 203 may be considered to be indicative of the intensity of the elastic scattering component.

Each image may be indicative of the intensity of the scattered light 203 (specifically of the elastic scattering component) for incident light 201 and/or scattered light 203 of a different wavelength. For the elastic scattering component, the change in wavelength of the incident light 201 will be the same as the change in wavelength of the scattered light 203, because the wavelength of the incident light 201 does not change in elastic scattering. A first of the at least two images may be obtained for incident light 201 and/or scattered light 203 of a first wavelength, and a second of the at least two images may be obtained for incident light and/or scattered light 203 of a second wavelength. The first wavelength is different from the second wavelength.

Alternatively, each image may be indicative of the intensity of scattered light 203 (specifically of the elastic scattering component) for incident light 201 of a different polarization state. A first of the at least two images may be obtained for incident light 201 of a first polarization state, and a second of the at least two images may be obtained for incident light 201 of a second polarization state. The first polarization state is different from the second polarization state.

Alternatively, each image may be indicative of the intensity of scattered light 203 (specifically of the elastic scattering component) of a different polarization state. A first of the at least two images may be obtained for scattered light 203 of a first polarization state, and a second of the at least two images may be obtained for scattered light 203 of a second polarization state. The first polarization state may be different from the second polarization state.

Each image may also be indicative of the intensity of scattered light 203 for a different combination of i) wavelength of the incident light 201 and/or the scattered light 203, ii) polarization state of the incident light 201, and/or iii) polarization state of the scattered light 203.

When each image is indicative of the intensity of scattered light 203 (specifically of the elastic scattering component) for incident light 201 and/or scattered light 203 of a different wavelength, the chemical and/or material specific information of the sample 300 may be determined based on the change in intensity of the elastic scattering component in dependence on the change in wavelength of the incident light 201 and/or the scattered light 203.

When each image is indicative of the intensity of scattered light 203 (specifically of the elastic scattering component) for incident light 201 of a different polarization state, the chemical and/or material specific information of the sample 300 may be determined based on the change in intensity of the elastic scattering component in dependence on the change in polarization state of the incident light 201.

When each image is indicative of the intensity of scattered light 203 (specifically of the elastic scattering component) of a different polarization state, the chemical and/or material specific information of the sample 300 may be determined based on the change in intensity of the elastic scattering component in dependence on the change in polarization state of the scattered light 203.

When each image is indicative of the intensity of scattered light 203 (specifically of the elastic scattering component) of a different combination of i) wavelength of the incident light 201 and/or the scattered light 203, ii) polarization state of the incident light 201, and/or iii) polarization state of the scattered light 203, the chemical and/or material specific information of the sample 300 may be determined based on the change in intensity of the elastic scattering component in dependence on the change in that combination.

In the first embodiment, the detection data may additionally comprise at least two further images, wherein each further image is indicative of the intensity of further scattered light 203. The further scattered light may comprise an inelastic scattering component that is due to Raman scattering (or preferably due to surface-enhanced Raman scattering) of the incident light in at least a portion of the sample. The further scattered light 203 may comprise only an inelastic scattering component, and not an elastic scattering component. The elastic scattering component may be filtered out of the further scattered light 203, for example using a wavelength filter that filters out any scattered light 203 having the same wavelength as the incident light 201. The wavelength of the elastic scattering component of the scattered light 203 will be the same as the wavelength of the incident light 201. For this purpose, the one or more detection devices 260 of the imaging apparatus 200 may comprise a wavelength filter for filtering out the scattered light 203 having the same wavelength as the incident light 201, or preferentially selecting the scattered light 203 having a wavelength other than the wavelength of the incident light 201. The wavelength filter may be a tunable wavelength filter, so as to allow adjustment of the wavelength of the scattered light 203 that is filtered out (and so not detected) by the one or more detection devices 260. The wavelength filter may be a narrow bandpass filter (e.g. passing wavelengths within a window having a width of less than 10 nm, preferably less than 5 nm, further preferably less than 2 nm). Preferably, the wavelength filter is a multiband narrow bandpass filter, i.e. a bandpass filter with multiple narrow bands (each for passing wavelengths within a window having a width of less than 10 nm, preferably less than 5 nm, further preferably less than 2 nm), so as to allow multiband detection of the inelastic scattering component that is due to Raman scattering.

Each further image may be indicative of the intensity of further scattered light 203 (specifically of the inelastic scattering component) for incident light 201 of a different wavelength. A first of the at least two further images may be obtained for incident light 201 of a first wavelength, and a second of the at least two further images may be obtained for incident light 201 of a second wavelength. The first wavelength is different from the second wavelength.

Alternatively, each further image may be indicative of the intensity of further scattered light 203 (specifically of the inelastic scattering component) of a different wavelength. For the inelastic scattering component, the change in wavelength of the incident light 201 will not be the same as the change in wavelength of the scattered light 203, because the wavelength of the incident light 201 changes in inelastic scattering. A first of the at least two further images may be obtained for scattered light 203 of a first wavelength, and a second of the at least two further images may be obtained for scattered light 203 of a second wavelength. The first wavelength is different from the second wavelength.

Alternatively, each further image may be indicative of the intensity of further scattered light 203 (specifically of the inelastic scattering component) for incident light 201 of a different polarization state. A first of the at least two further images may be obtained for incident light 201 of a first polarization state, and a second of the at least two further images may be obtained for incident light 201 of a second polarization state. The first polarization state is different from the second polarization state.

Alternatively, each further image may be indicative of the intensity of further scattered light 203 (specifically of the inelastic scattering component) of a different polarization state. A first of the at least two further images may be obtained for scattered light 203 of a first polarization state, and a second of the at least two further images may be obtained for scattered light 203 of a second polarization state. The first polarization state is different from the second polarization state.

Each further image may also be indicative of the intensity of scattered light 203 (specifically of the inelastic scattering component) for a different combination of i) wavelength of the incident light 201, ii) wavelength of the scattered light 203, iii) polarization state of the incident light 201, and/or iv) polarization state of the scattered light 203.

Determining the chemical and/or material specific information of the sample 300 may be further based on the change in intensity of the inelastic scattering component in dependence on the change in wavelength and/or the change in polarization state of the incident light 201 and/or the scattered light 203. When each image is indicative of the intensity of scattered light 203 (specifically of the inelastic scattering component) for a different combination of i) wavelength of the incident light 201, ii) wavelength of the scattered light 203, iii) polarization state of the incident light 201, and/or iv) polarization state of the scattered light 203, the chemical and/or material specific information of the sample 300 may be determined additionally based on the change in intensity of the elastic scattering component in dependence on the change in that combination.

The dependence of the intensity of the inelastic scattering component on the change in wavelength and/or polarization state of the incident and/or scattered light may thus be taken into account in addition to the dependence of the intensity of the elastic scattering component on the change in wavelength and/or polarization state of the incident and/or scattered light when determining the chemical and/or material specific information of the sample 300. Because more information is available in determining the chemical and/or material specific information of the sample 300, this determination may be more accurate compared to a situation in which only the change in intensity of the elastic scattering component or only the change in intensity of the inelastic scattering component is taken into account.

In a second embodiment, the scattered light 203 may comprise an inelastic scattering component that is due to Raman scattering (or preferably due to surface-enhanced Raman scattering) of the incident light 201 in at least a portion of the sample 300. The scattered light 203 may comprise only an inelastic scattering component, and not an elastic scattering component. The elastic scattering component may be filtered out of the scattered light 203, for example using a wavelength filter that filters out scattered light 203 having the same wavelength as the incident light 201. The wavelength of the elastic scattering component of the scattered light 203 will be the same as the wavelength of the incident light 201. For this purpose, the one or more detection devices 260 of the imaging apparatus 200 may comprise a wavelength filter for filtering out the scattered light 203 having the same wavelength as the incident light 201, or preferentially selecting the scattered light 203 having a wavelength other than the wavelength of the incident light 201. The wavelength filter may be a tunable wavelength filter, so as to allow adjustment of the wavelength of the scattered light 203 that is filtered out (and so not detected) by the one or more detection devices 260. The wavelength filter may be a narrow bandpass filter (e.g. passing wavelengths within a window having a width of less than 10 nm, preferably less than 5 nm, further preferably less than 2 nm). Preferably, the wavelength filter is a multiband narrow bandpass filter, i.e. a bandpass filter with multiple narrow bands (each for passing wavelengths within a window having a width of less than 10 nm, preferably less than 5 nm, further preferably less than 2 nm), so as to allow multiband detection of the inelastic scattering component that is due to Raman scattering.

Each image may be indicative of the intensity of scattered light (and specifically of the inelastic scattering component) of a different wavelength. A first of the at least two images may be obtained for scattered light 203 of a first wavelength, and a second of the at least two images may be obtained for scattered light 203 of a second wavelength. The first wavelength is different from the second wavelength. Each image may thus be detected using multiband detection.

Alternatively, each image may be indicative of the intensity of scattered light 203 (specifically of the inelastic scattering component) for incident light 201 of a different polarization state. A first of the at least two images may be obtained for incident light 201 of a first polarization state, and a second of the at least two images may be obtained for incident light 201 of a second polarization state. The first polarization state is different from the second polarization state.

Alternatively, each image may be indicative of the intensity of scattered light (and specifically of the inelastic scattering component) of a different polarization state. A first of the at least two images may be obtained for scattered light 203 of a first polarization state, and a second of the at least two images may be obtained for scattered light 203 of a second polarization state. The first polarization state is different from the second polarization state.

Each image may also be indicative of the intensity of scattered light 203 (specifically of the inelastic scattering component) for a different combination of i) wavelength of the scattered light 203, ii) polarization state of the incident light 201, and/or iii) polarization state of the scattered light 203.

In the second embodiment, determining the chemical and/or material specific information of the sample is based on the change in intensity of the inelastic scattering component in dependence on the change in wavelength and/or the change in polarization state of the incident light 201 and/or the scattered light 203.

When each image is indicative of the intensity of the scattered light 203 (specifically of the inelastic scattering component) of a different wavelength, the chemical and/or material specific information of the sample 300 may be determined based on the change in intensity of the inelastic scattering component in dependence on the change in wavelength of the scattered light 203.

When each image is indicative of the intensity of the scattered light 203 (specifically of the inelastic scattering component) for incident light 201 of a different polarization state, the chemical and/or material specific information of the sample 300 may be determined based on the change in intensity of the inelastic scattering component in dependence on the change in polarization state of the incident light 201.

When each image is indicative of the intensity of the scattered light 203 (specifically of the inelastic scattering component) of a different polarization state, the chemical and/or material specific information of the sample 300 may be determined based on the change in intensity of the inelastic scattering component in dependence on the change in polarization state of the scattered light 203.

When each image is indicative of the intensity of scattered light 203 (specifically of the inelastic scattering component) for a different combination of i) wavelength of the scattered light 203, ii) polarization state of the incident light 201, and/or iii) polarization state of the scattered light 203, the chemical and/or material specific information of the sample 300 may be determined based on the change in intensity of the inelastic scattering component in dependence on the change in that combination.

Preferably, in the first embodiment and/or in the second embodiment, the at least two images comprise at least four images (or at least 6 images, or at least 10 images, or at least 20 images). Each image is indicative of the intensity of the scattered light 203 for a different combination of i) wavelength of the incident light 201 and ii) polarization state of the incident light 201 and/or the scattered light 203. Determining the chemical and/or material specific information of the sample 300 is based on the change in intensity of the scattered light 201 in dependence on both the change in wavelength and the change in polarization state of the incident light 201 and/or the detected light 203.

Preferably, the at least four images are obtained at at least two (or at least 5, preferably at at least 10, further preferably at at least 20) different wavelengths of incident light 201 and at at least two (or at at least 3, preferably at at least 5) different polarization states of the incident light 201 and/or the scattered light 203. As such, the wavelength-polarization signature for Rayleigh and/or Raman scattering of the sample 300 may be determined by illuminating the sample with incident light 201 of at least two (or at at least 5, preferably at at least 10, further preferably at at least 20) different wavelengths (w1, w2, . . . ) and, at each wavelength, of at least two (or at at least 3, preferably at at least 5) different polarization states (p1, p2, . . . ). Alternatively or additionally, the wavelength-polarization signature for Rayleigh and/or Raman scattering of the sample 300 may be determined by illuminating the sample with incident light 201 of at least two (or at at least 5, preferably at at least 10, further preferably at at least 20) different wavelengths (w1, w2, . . . ) and detecting, at each wavelength, the scattered light 203 of at least two (or at at least 3, preferably at at least 5) different polarization states ($p^*1, p^*2, \ldots$). The intensity of the scattered light 203 may be detected for each wavelength-polarization state tuple (w1p1$p^*$1, w1p2p1, . . . , w2p1$p^*$1, w2p2$p^*$1, w1p1$p^*$2, . . . ).

Determining the chemical and/or material specific information of the sample 300 based on the change in intensity of the scattered light 203 in dependence on both the change in wavelength and the change in polarization state of the incident light 201 and/or the scattered light 203, allows for the wavelength dependence of the polarization dependence of Rayleigh and/or Raman scattering to be taken into account. This wavelength dependence of the polarization dependence of Rayleigh and/or Raman scattering may be characteristic of the sample 300, and in particular of the chemical and/or material specific information of the sample 300. Taking into account the wavelength dependence of the polarization dependence of Rayleigh and/or Raman scattering may, in certain situations, allow for more accurate and/or reliable determination of the chemical and/or material specific information compared to a situation in which only the wavelength dependence or only the polarization state dependence of Rayleigh and/or Raman scattering on the sample 300 is taken into account when determining the chemical and/or material specific information. In other situations, the wavelength dependence of the polarization dependence of Rayleigh and/or Raman scattering may not yield any more reliable or accurate determination of the chemical and/or material specific information.

Receiving or Obtaining Detection Data

In the first or second embodiment, the detection data may be received from the imaging apparatus 200, in particular from the one or more detection devices 260 of the imaging apparatus 200.

The step S110 of receiving the detection data may comprise a step S112 of illuminating the sample with the incident light 201 of i) at least two different polarization states and/or ii) at least two different wavelengths. The sample scatters the incident light 201 to create the scattered light 203. The step S110 of receiving the detection data may further comprise a step S114 of detecting the scattered light 203 at each combination of wavelength and polarization state of the incident light 201, thereby creating the detection data.

Additionally, the scattered light 203 of at least two different polarization states may be detected at each combination of wavelength and/or polarization state of the incident light 201, thereby creating the detection data.

In an embodiment, the scattered light 203 is detected in a direction that is different from the propagation direction of the incident light 201. This reduces the risk of the incident light 201 that is not scattered so as to create the scattered light 203 being detected by the one or more detection devices 260 of the imaging apparatus 200.

In a preferred embodiment, the step of illuminating the sample comprises illuminating the sample with a light sheet 201' of the incident light 201. For this purpose, the imaging apparatus 200, in particular the one or more illumination devices 210 and the one or more detection devices 260, may comprise a light sheet microscope. The step of detecting the scattered light 203 may comprise imaging the light sheet 201' at an angle to the plane of the light sheet 201'. Light sheet microscopy describes a family of techniques including Ultramicroscopy, Selective Plane Illumination Microscopy (SPIM), Orthogonal-Plane Fluorescence Optical Sectioning (OPFOS), HR-OPFOS, and DLSM (digitally scanned light sheet), among others. A light sheet microscope may operate as follows: a thin plane of light (or light sheet 201') illuminates a plane through the sample 300, where the light sheet 201' is coincident with the focal plane of a detection objective (which may be positioned perpendicular or at an angle to an illumination objective); the light scattered by/emitted from/originating from the sample 300 is collected by the detection objective, is filtered as is necessary by wavelength, polarisation state or some other parameter, and is then detected using a camera (CMOS, CCD, etc.). Since only a (substantially) 2-dimensional plane of the sample 300 is illuminated, and no areas above or below the illumination plane are subjected to light exposure, the total light dose on the sample is reduced compared to confocal microscopy or other widefield and single-objective imaging techniques. Furthermore, since a full (substantially) 2-dimensional plane is illuminated and captured in each image frame, light sheet microscopy is inherently a powerful technique for fast 3D imaging, by moving the sample 300 in a direction perpendicular to the light sheet 201'. The separate illumination and detection paths of a light sheet microscope allow for independent fine control of the properties of light in the two paths, allowing careful control of wavelength, polarisation, and other properties in one light path without disturbing the other.

The step of illuminating the sample 300 may comprise illuminating the sample 300 simultaneously with the incident light 201 of the at least two different wavelengths and/or of the at least two different polarization states. For this purpose, the imaging apparatus 200 may comprise a single illumination device 210 that emits light of two or more different wavelengths. Alternatively, the imaging apparatus 200 may comprise two or more illumination devices 210, each illumination device 210 emitting light of a different wavelength.

When the sample is illuminated simultaneously with the incident light 201 of the at least two different wavelengths and/or of the at least two different polarization states, the at least two images may be detected at the different conditions of the scattered light 203. For example, each image may be detected consecutively in time, such that a first image is detected at a first condition (e.g. a first wavelength and/or first polarization state of the scattered light 203) during a first time interval and a second image is detected at a second condition (e.g. a second wavelength and/or second polarization state of the scattered light 203) during a second time interval. The step S114 of detecting the scattered light 203 may thus comprise consecutively detecting scattered light 230 of the at least two different wavelengths and/or of the at least two different polarization states. Alternatively, each image may be detected simultaneously. For this purpose, the imaging apparatus 200 may comprise at least two detection devices 260. Each detection device 260 may be provided at a different angle with respect to the portion of the sample 300 that is illuminated with the incident light 201, so as to detect different parts of the scattered light 203. The step S114 of detecting the scattered light 203 may thus comprise simultaneously detecting scattered light 203 of the at least two different wavelengths and/or of the at least two different polarization states. For example, a first detection device 260 may detect the scattered light of the first wavelength, and a second detection device 260 may detect the scattered light of the second wavelength. For this purpose, each detection device 260 may comprise a respective wavelength filter for preferentially selecting a respective wavelength. When detecting the elastic scattering component that is due to Rayleigh scattering, each detection device 260 may comprise a respective wavelength filter for preferentially selecting a different one of the wavelengths of the incident light 201. In an alternative example, a first detection device 260 may detect the scattered light of the first polarization state, and a second detection device 260 may detect the scattered light of the second polarization state. For this purpose, each detection device 260 may comprise a respective polarizer for preferentially selecting a respective polarization state.

Alternatively, the step S112 of illuminating the sample 300 may comprise illuminating the sample 300 consecutively with incident light 201 of at least two different wavelengths and/or of at least two different polarization states. For this purpose, the imaging apparatus 200 may comprise a single illumination device 210 that emits light of two or more different wavelengths and/or polarization states at different times. For example, the illumination device 210 may comprise a tunable light source that emits light of a first wavelength during a first time interval, and then emits light of a second wavelength during a second time interval. Alternatively, the illumination device 210 may comprise a tunable wavelength filter that allows adjustment of the wavelength of the incident light 201. Alternatively or additionally, the illumination device 210 may comprise a tunable polarizer that allows adjustment of the polarization state of the incident light 201.

When the sample is illuminated consecutively with the incident light 201 of the at least two different wavelengths and/or of the at least two different polarization states, the imaging apparatus 200 may comprise a single detection device 260. The single detection device 260 may detect a first of the at least two images during the first time interval, and a second of the at least two images during the second time interval. The step S114 of detecting the scattered light may thus comprise consecutively detecting scattered light of the at least two different wavelengths and/or of the at least two different polarization states. Alternatively, the imaging apparatus 200 may comprise two or more detection devices 260, for example for simultaneously detecting scattered light 203 of at least two different wavelengths and/or polarization states during each time interval. The step S114 of detecting the scattered light 203 may thus comprise simultaneously detecting scattered light 203 of the at least two different wavelengths and/or of the at least two different polarization states.

The step S112 of illuminating the sample 300 may comprise scanning the wavelength of the incident light 201 at a rate that is greater or equal to 0.1 nm/s (for example greater than 200 nm/ms), or switching between different wavelengths of the incident light 201 at a rate greater than 20 mHz, preferably greater than 60 mHz, e.g a rate greater than 200 mHz. This may comprise scanning the wavelength using a tunable wavelength light source (e.g. a tunable laser, such as a Solstis laser) and/or using a tunable wavelength filter or other such single or multitude of devices to provide different wavelengths. Additionally or alternatively, illuminating the sample 300 may comprise changing the polarization state of the incident light at a rate greater than 0.001 Hz, preferably greater than 60 mHz, e.g a rate greater than 200 Hz, such as 1 kHz, for example using a tunable polarizer such as a Pockels cell. Similarly, the step S114 of detecting the scattered light 203 may comprise scanning the wavelength of the scattered light 203 at a rate that is greater or equal to 0.1 nm/s (for example greater than 200 nm/ms), for example using a tunable wavelength filter, or switching between different wavelengths of the incident light 201 at a rate greater than 20 Hz, preferably greater than 60 mHz, e.g a rate greater than 200 Hz. The step S114 of detecting the scattered light 203 may, additionally or alternatively, comprise changing the polarization state of the scattered light 203 at a rate greater than 0.001 Hz, preferably greater than 60 mHz, e.g a rate greater than 200 Hz, such as 1 kHz, for example using a tunable polarizer such as a Pockels cell. Fast switching of the conditions at which the two or more images are obtained may allow fast determination of the chemical and/or material specific information in real time imaging, such as video imaging. This may be useful in medical applications in implants and prosthetics, such as implant and prosthetics design relying on in-situ imaging of cells on implants and screening of materials for bio-integration (osseo-integration etc.), deep-tissue imaging for biopsy investigation, and in plant sciences, to study the penetration effect of pesticides and herbicides both in pests and in agricultural crops.

In an embodiment, no labelling or staining agent is introduced into the sample 300 before the sample 300 is illuminated with the incident light 201. The method 100 allows determination of the chemical and/or material specific information based on the characteristic wavelength dependence, polarization state dependence, or wavelength-polarization state dependence of the chemical and/or material specific information of a sample 300, and so labelling or staining agents used in traditional chemical imaging are optional and not strictly required.

FIG. 3 depicts an exemplary embodiment of the imaging apparatus 200, in particular of the one or more illumination devices 210 and the one or more detection devices 260, of the imaging apparatus 200. The imaging apparatus 200 of FIG. 3 is a light sheet microscope.

In the embodiment of FIG. 3, the one or more illumination devices 210 comprise a single illumination device 210, in that a single optical path is provided for illuminating the sample 300. However, it will be apparent that more than one illumination device 210 may be provided, in that two or more (optionally partially overlapping) optical paths may be provided for illuminating the sample 300.

The illumination device 210 comprises a light source 220. The light source 220 may emit light of a single tunable wavelength, and for example be a tunable light source, such as a tunable laser (e.g. a Solstis laser). The light source 220 may thus adjust the wavelength of the incident light 210 over time. Alternatively, the light source 220 may emit light of two or more different wavelengths, e.g. light of two or more different discrete wavelengths or light comprising a range of wavelengths, such as white light. For this purpose, multiple light sources 220 may be provided, each emitting light of a different wavelength.

The illumination device 210 may further comprise a beam shaping element APM, such as an airy phase mask or other beam shaping element. The beam shaping element may shape the light emitted by the light source 220, and so the incident light 201, into a desired phase and/or intensity profile, such as an annulus or a vortex shape.

The illumination device 210 may comprise a scanning element 230, such as a scanning mirror. The light scanning element 230 may scan the incident light 201 across the sample 300. The light scanning element 230 may scan the incident light 201 in one dimension, for example in the direction in and out of the plane of FIG. 3.

The illumination device 210 may further comprise a polarization changing optical component, such as an input polarizer 240. The input polarizer 240 may be a tunable polarizer for adjusting the polarization state of the incident light 201. The input polarizer may comprise, for example, a Pockels cell for fast rotation (e.g. 90° rotation) of the polarization angle of a linear polarized light, or for a full scan of the polarization angle (e.g. between 0° and 90° rotation) relative to the plane of the sample 300 that is illuminated. This allows measurement of any polarization anisotropy arising due to scattering of the incident light 201 by the sample 300, for example in combination with scanning the wavelength of the incident light 201 and/or switching the polarization state of the scattered light 203 (e.g. between 0° and 90° rotation) that is detected by the one or more detection devices 260.

Optionally, the input polarizer may additionally comprise a half-wave plate or quarter-wave plate. Varying the angle of linearly polarized light incident on the quarter-wave plate between −45° and 45° relative to the fast axis of the quarter-wave plate allows switching between left- and right-handed circular polarization states. This allows measurement of Rayleigh optical activity or circular dichroism, and so may be particularly useful to determine the wavelength-polarization signature of the sample 300, for example in combination with scanning the wavelength of the incident light 201 and/or switching the polarization state (e.g. between 0° and 90' rotation) of the scattered light 203 that is detected by the one or more detection devices 260. Alternatively, the input polarizer may allow switching between different elliptical polarization states, or between an azimuthal and a radial polarization state. This may be useful to detect further distinct polarization contrast mechanisms.

The illumination device 210 may further comprise an illumination objective 250 for focussing the incident light 201 on a portion of the sample 300. In combination with the scanning element 230, the focussed incident light 201 may be scanned across a plane of the sample 300, so as to illuminate a light sheet within the sample 300. The optical axis of the illumination objective 250 may be arranged at an angle to the plane of the sample 300 that is illuminated, e.g. at a 45° angle to that plane. The clearance distance between the illumination objective 250 and the sample 300 may be a predefined minimum distance, for example greater than 2 mm. The clearance distance may depend on the configuration of the microscope and lens, and could range from a few micrometres to a few centimetres or more.

The illumination device 210 may comprise further optical elements for guiding and/or adjusting the properties of the incident light 201, such as lenses $L_1$-$L_4$ and mirror M.

The illumination device 210 may further comprise focussing optical elements in an illumination path. The focussing optical elements may be configured to allow focussing of the incident beam substantially without chromatic aberration for wavelengths in the range 350-30000 nm. The inventors have found that use of such a chromatic aberration free system is advantageous to prevent the effects due to different foci of different wavelengths when changing wavelengths and provides particularly good imaging performance.

The imaging apparatus 200 may comprise a stage (not shown) that may support the sample 300. The stage may be movable, for example controllably movable, in the x, y and/or z directions, thus allowing movement of the sample 300 in the x, y and/or z directions. Moving the sample 300 in the z-direction allows 3d imaging of the sample 300, by imaging a light sheet at a plurality of z-coordinates of the sample 300 and reconstructing the 3d image from the plurality of obtained images.

In the embodiment of FIG. 3, the one or more detection devices 260 comprise two detection devices 260. However, it will be apparent that instead a single detection device 260, or more than two detection devices 260, may be provided.

Each of the two detection devices 260 comprises a respective image capture element 290, such as a camera, for example a sCMOS or sCMOS/EM CCD camera.

Each of the two detection devices 260 shares a common detection objective 270 for collecting the scattered light 203, as well as a polarization changing optical component, such as a common output polarizer 280 for adjusting the polarization state of the scattered light 203. However, it will be appreciated that each detection device 260 may comprise its own detection objective 270 and output polarizer 280.

The optical axis of the detection objective 270 may be arranged at an angle to the plane of the sample 300 that is illuminated, i.e. at an angle between 0° and 180° with respect to the plane (0° being on the side of the illumination objective 250), preferably at an angle between 90° and 180° with respect to that plane, further preferably at substantially a 135° angle to that plane. Preferable, the optical axis of the detection objective 270 is arranged at an angle to the optical axis of the illumination objective 250, for example at an angle in the range from 45° to 135°, preferably from 75° to 105°, more preferably substantially 90°. This reduces the risk of incident light 201 that is not scattered by the sample 300 being collected by the detection objective 270. The clearance distance between the detection objective 270 and the sample 300 may be a predefined minimum distance, for example greater than 2 mm.

The output polarizer 280 may comprise a tunable polarizer for switching the polarization state (e.g. between 0° and 90° rotation) of the scattered light 203. Optionally, the output polarizer may additionally comprise a quarter-wave plate or half-wave plate.

The detection devices 260 may comprise further optical elements for guiding and/or adjusting the properties of the scattered light 203, such as additional polarizers P and/or a tunable telescope T. A beam splitter B may be used to direct part of the scattered light 203 to one of the image capture elements 290 and to direct another part of the scattered light 203 to another one of the image capture element 290.

Determining Chemical and/or Material Specific Information

The step S120 of determining the chemical and/or material specific information of the sample 300 may comprises determining or calculating, from the detection data, a wavelength-polarization signature. The wavelength-polarization signature is indicative of the change in intensity of the scattered light 203 in dependence on the change in wavelength and/or the change in polarization state of the incident light 201 and/or the scattered light 203.

Determining the chemical and/or material specific information of the sample 300 may further comprise identifying, in a library associating a plurality of predetermined wavelength-polarization signatures with respective chemical and/or material specific information, the chemical and/or material specific information that is associated with the predetermined wavelength-polarization signature that most closely corresponds to the calculated or determined wavelength-polarization signature. Determining the chemical and/or material specific information of the sample 300 may further comprise determining, as the chemical and/or material specific information of the sample 300, the identified chemical and/or material specific information. The library may be prepared prior to the determination of the chemical and/or material specific information of the (unknown) sample 300, for example by first determining the wavelength-polarization signature of a plurality of known samples with known chemical and/or material specific information, and then storing the determined wavelength-polarization signature in association with respective chemical and/or material specific information in the library.

The wavelength-polarization signature may be a spectrum or a mathematical function, e.g. a mathematical function describing a spectrum. The spectrum may be obtained by plotting the intensity of the scattered light 203 at each wavelength of a plurality of different wavelengths of the incident light 201 and/or the scattered light 203, for example, thus indicating the dependence of the intensity of the scattered light 203 on the wavelength of the incident light 201 and/or the scattered light 203. In a preferred embodiment, the wavelength-polarization signature may be a plurality of spectra, such as one spectrum per polarization state of the incident light 201 and/or of the scattered light 203, thus indicating the wavelength dependence of the polarization dependence of the intensity of the scattered light 203. The mathematical function may be determined based on the spectrum or the spectra, so as to represent the wavelength dependence or the wavelength dependence of the polarization dependence of the intensity of the scattered light 203. By taking into account the relative differences in intensity for different wavelengths and/or polarization states of the incident light 201 and/or the scattered light 203, the Mie component (which is polarization and wavelength independent, and so will not contribute to these relative differences) can be disregarded in the determination of the chemical and/or material specific information. As such, the Mie component may effectively be filtered out of the received images.

The wavelength-polarization signature may be a difference image. For example, difference images may be determined for 90° differences in linear polarisation of the incident light 201, after appropriate pre-processing, at each wavelength using:

$$I_{contrast/in} = \frac{|I_{par} - I_{perp}|}{I_{par} + I_{perp}}$$

where $I_{par}$ and $I_{perp}$ are where the electric field of incident light 201 is parallel or perpendicular to the plane of the light sheet 201'.

Similarly, difference images for changing linear polarisation in the detection path can be determined using:

$$I_{contrast/out} = \frac{|I_H - I_V|}{I_H + I_V}$$

where $I_H$ and $I_V$ are two orthogonal polarisation states in the detection path of the light sheet microscope, and where $I_H$ is the polarisation state with the fast axis of the linear polariser orientated along the scan direction of the light sheet 201'.

Similarly, left- and right-handed circular (LHC, RHC) polarisation states may be used for measurement of Raman and Rayleigh Optical Activity, where Raman and Rayleigh Optical Activity may be used to distinguish signals based upon molecular chirality. Difference images for changes in circular polarisation of the incident light 201 may be determined using:

$$I_{OA} = \frac{|I_{RHC} - I_{LHC}|}{I_{RHC} + I_{LHC}}$$

Where $I_{RHC}$ and $I_{LHC}$ are the left- and right-handed polarisation states of the incident electric field.

The difference images may be indicative of the chemical and/or material specific information of the sample 300, because they may highlight the polarization dependence of the intensity of scattered light 203. The Mie component, which is polarization independent, will not be significant in the difference images, such that the Rayleigh component, which is polarization dependent, may dominate the difference images. The difference images may thus provide an indication of the chemical and/or material specific information of the sample 300, and provide selective contrast based on the chemical and/or material specific information of the sample, rather than based on morphological or structural information of the sample 300.

In an alternative embodiment, the step S120 of determining the chemical and/or material specific information of the sample 300 comprises calculating the chemical and/or material specific information based on the change in intensity of the scattered light 203 in dependence on the change in wavelength and/or the change in polarization state of the incident light 201 and/or the scattered light 203. Put another way, the chemical and/or material specific information may be determined from first principles based on the change in intensity of the scattered light 203 in dependence on the change in wavelength and/or the change in polarization state of the incident light 201 and/or the scattered light 203.

For example, for the elastic scattering component $I_R$ that is due to Rayleigh scattering, the following relation applies:

$$I_R = I_0 \left(\frac{2\pi n_0}{\lambda}\right)^4 \left(\frac{r^6}{2D^2}\right) \left(\frac{\varepsilon - 1}{\varepsilon + 2}\right)^2 (1 + \cos^2\theta)$$

where $I_R$ is the intensity of the elastic scattering component that is due to Rayleigh scattering, $I_0$ is the intensity of the incident light 201, $\lambda$ is the wavelength of the incident light 201, $n_0$ is the refractive index of the atmosphere surrounding the sample 300 (e.g. $n_0$=1 for air), r and D are size parameters that are fixed for the sample 300, $\theta$ is the scattering angle (which may be determined, or known for a given microscope collection geometry, and e.g. be 90° in a typical light sheet microscope), and $\varepsilon$ is a sample specific dielectric function (i.e. chemical and/or material specific information of the sample 300) that relates to the molecular polarizability (molecule specific) of the sample 300. As such, by measuring the intensity of the elastic scattering component at different wavelengths and/or polarizations of the incident light 201 and/or the scattered light 203, and eliminating the wavelength dependence, the wavelength and polarization dependence of the sample specific dielectric function E may be determined. In particular, the above relation may be rearranged to provide:

$$\varepsilon = \frac{1 + 2A}{1 - A},$$

where $A \equiv \left(\frac{I_R}{\left[I_0\left(\frac{2\pi n_0}{\lambda}\right)^4\left(\frac{r^6}{2D^2}\right)^2(1+\cos^2\theta)\right]}\right)^{0.5}$.

Further alternatively, the step of determining the chemical and/or material specific information of the sample 300 may comprise multivariate numerical methods, such as principal component analysis, or clustering methods, such as K-Means clustering or Fuzzy C-Means clustering, etc. for initial classification (based on known samples) and subsequent identification (based on unknown samples) of the chemical and/or material specific information. This allows different regions of a sample (e.g. a cell, such as an oocyte) to be identified based on the acquired Rayleigh scattering data, without prior knowledge of a particular Rayleigh signature of the sample.

Alternatively, an algorithm (e.g. a neural network) may be trained using a training data set of images indicative of the intensity of scattered light for a known set of sample materials (such as biological samples, e.g. cells and tissue, with and without disease), so as to train the algorithm to segment or automatically identify an unknown sample (or areas within an unknown sample). Further alternatively, a neural network may train itself to identify defects from a collection (e.g. 10s or 100s) of images indicative of the intensity of scattered light of samples with predetermined chemical and/or material specific information (for example, images of embryos that are healthy or have different types of DNA defects). The trained neural network could then be used to identify chemical and/or material specific information in unknown samples. The use of Rayleigh and/or Raman scattered data, in addition to any morphological imaging data, may allow the neural network to converge more quickly compared to a situation in which the neural network uses only morphological images.

The present invention may also be combined with further imaging techniques, such as super-resolution imaging. This may involve a fluctuation correlation approach (such as SRRF and MUSICAL methods). The fluctuation may be in the spatial domain or time domain (blinking of intensity or polarization). For example, 10-100 identical exposures of the sample may be taken in quick succession, the variation of the centroid of a signal may be determined, and this variation may be taken into account in the calculation of the position of the centroid so as to more accurately determine the position, thereby creating super-resolved images of the sample.

In summary, the method 100 and the imaging apparatus 200 allow combination of wavelength-scanning and polarisation-scanning with single- or multi-band spectral or polarisation-sensitive detection. This combination may enable fast label-free chemical imaging using both Raman and Rayleigh scattering on a light sheet microscopy platform. This solves a key problem in direct Raman imaging, as incident light power is spread uniformly across an entire plane to reduce the power density compared to a standard point-scanning Raman microscope, while retaining sufficient power density and using a camera with sufficient sensitivity to collect high-contrast Raman-scattering images at high frame rates. Using fast wavelength scanning for fast coverage of a wide wavelength range allows full-spectrum acquisition at biologically relevant framerates. In combination with multi-band imaging, this allows efficient collection of many Raman-shifted images through multiband detection while performing wavelength-scanning, which also serves to reduce total laser exposure.

The Rayleigh-scattering spectroscopic imaging of the present invention is a uniquely powerful new method for microscopy, and light sheet microscopy in particular. Normally, Rayleigh-scattered light is used only for morphological imaging, or is discarded as it is considered to be part of the background, e.g. in Raman spectroscopy. Using a narrow line-width laser that has fast wavelength-scan capabilities, such as a Solstis laser, and in combination with orthogonal detection (as in a light sheet microscope), the polarization states can be extracted easily, allowing molecular information to be obtained as a function of the wavelength-polarization signature.

A number of applications of these label-free contrast imaging methods have been envisaged. There are key potential applications across the medical and biomedical fields, primarily connected to fast 3d imaging of live cell cultures to obtain chemically-specific information over volumes and time-period that were previously considered unachievable. In cancer biology, applications in the imaging of cancer spheroids, and in drug discovery, especially in 3d localisation and visualisation of drugs within subcellular compartments, are possible.

The increased information content and imaging depth into tissues and samples using the present invention opens numerous avenues for exploration in a wide variety of fields. The present invention enables whole-sample imaging and optical sectioning, providing high information content without unnecessarily high power density. The low phototoxicity inherent to the present invention is especially important for sensitive samples, whose cell cycle is easily interrupted with high levels of light exposure, which can cause damage to intracellular components including mitochondria and DNA. The present invention may be used to determine the viability of oocytes and for clinical assessment of preimplantation embryos to improve IVF success rates.

Furthermore, the present invention may be used to study nanoparticles toxicology by minimising the risk of sample damage and localised super-heating of plasmonic nanoparticles. The low phototoxicity of the imaging method and the imaging geometry, which gives a large field of view and intrinsic fast 3d imaging capability, makes the method 100 particularly well-suited for the study of carbon, metallic and plastic nanoparticles and their toxicological effect on human, animal and plant systems. The increased specificity and imaging depth also allows the impenetrable, non-culturable bacteria within biofilms to be imaged and detected more effectively and with greater extracellular context.

The invention claimed is:

1. A method for obtaining chemical and/or material specific information of a sample based on scattered light, the method comprising:
   receiving detection data comprising at least two images, wherein each of the at least two images is indicative of an intensity of detected scattered light
   i) for incident light of a different wavelength, or
   ii) for incident light of a different polarization state, or
   iii) of a different polarization state,
   wherein the detected scattered light comprises an elastic scattering component that is due to Rayleigh scattering of the incident light in at least a portion of the sample; and
   determining the chemical and/or material specific information of the sample based on a change in intensity of the elastic scattering component in dependence on the of at least one of a change in wavelength of the incident light and/or the scattered light or a change in polarization state of the incident light and/or the scattered light, wherein:
   receiving the detection data comprises: illuminating the sample with the incident light of at least one of i) at least two different polarization states or ii) at least two different wavelengths, wherein the sample scatters the incident light to create the scattered light; and detecting the scattered light at each combination of wavelength and polarization state of the incident light, thereby creating the detection data;
   illuminating the sample comprises illuminating the sample with a light sheet of the incident light; and
   detecting the scattered light comprises imaging the light sheet at an angle to a plane of the light sheet.

2. The method of claim 1, wherein the detection data comprises at least two further images, wherein each of the at least two further images are indicative of the intensity of further detected scattered light
   i) for incident light of a different wavelength, or
   ii) for incident light of a different polarization state, or
   iii) of a different wavelength, or
   iv) of a different polarization state,
   wherein the further detected scattered light comprises an inelastic scattering component that is due to Raman scattering of the incident light in at least a portion of the sample; and
   wherein the determining the chemical and/or material specific information of the sample is further based on a change in intensity of the inelastic scattering component in dependence on the change in wavelength and/or the change in polarization state of the incident light and/or the scattered light.

3. The method of claim 1, wherein the at least two images comprise at least four images, and wherein each of the at least four images are indicative of the intensity of the detected scattered light for a different combination of i) a wavelength of the incident light and ii) a polarization state of the incident light and/or the scattered light; and
   wherein determining the chemical and/or material specific information of the sample is based on the change in the intensity of the detected scattered light in dependence on both the change in the wavelength of the incident light and/or the detected scattered light and the change in polarization state of the incident light and/or the detected scattered light.

4. The method of claim 1, wherein scattered light of at least two different polarization states is detected at each combination of wavelength and polarization state of the incident light, thereby creating the detection data.

5. The method of claim 1, wherein illuminating the sample comprises illuminating the sample simultaneously with at least one of the incident light of the at least two different wavelengths or the incident light of the at least two different polarization states.

6. The method of claim 1, wherein illuminating the sample comprises illuminating the sample consecutively with at least one of the incident light of at least two different wavelengths or the incident light of at least two different polarization states.

7. The method of claim 1, wherein detecting the scattered light comprises simultaneously detecting at least one of scattered light of the at least two different wavelengths or scattered light of the at least two different polarization states.

8. The method of claim 1, wherein detecting the scattered light comprises consecutively detecting at least one of scattered light of the at least two different wavelengths or scattered light of the at least two different polarization states.

9. The method of claim 1, wherein illuminating the sample comprises scanning the wavelength of the incident light at a rate that is greater or equal to 0.1 nm/s.

10. The method of claim 1, wherein illuminating the sample comprises at least one of changing the polarization state of the incident light or changing the polarization state of the scattered light at a rate of more than 0.001 Hz.

11. The method of claim 1, wherein no labelling or staining agent is introduced into the sample before the sample is illuminated with the incident light.

12. The method of claim 1, wherein determining the chemical and/or material specific information of the sample comprises:
calculating, from the detection data, a wavelength-polarization signature indicative of the change in intensity of the detected scattered light in dependence of at least one of the change in wavelength of the incident light and/or the scattered light or the change in polarization state of the incident light and/or the scattered light,
identifying, in a library associating a plurality of predetermined wavelength-polarization signatures with respective chemical and/or material specific information, an identified chemical and/or material specific information that is associated with a predetermined wavelength-polarization signature that most closely corresponds to the wavelength-polarization signature calculated; and
determining, as the chemical and/or material specific information of the sample, the identified chemical and/or material specific information.

13. The method of claim 12, wherein the wavelength-polarization signature is a spectrum or a mathematical function.

14. The method of claim 1, wherein determining the chemical and/or material specific information of the sample comprises calculating the chemical and/or material specific information based on the change in intensity of the detected scattered light in dependence of at least one of the change in wavelength of the incident light and/or the scattered light or the change in polarization state of the incident light and/or the scattered light.

15. An imaging apparatus for obtaining chemical and/or material specific information of a sample based on scattered light, the imaging apparatus comprising:
one or more illumination devices configured to illuminate at least a portion of the sample with incident light, and
one or more detection devices configured to detect at least two images indicative of an intensity of an elastic scattering component of scattered light that is due to Rayleigh scattering of the incident light in the portion of the sample,
wherein for each of the at least two images
  i) the one or more illumination devices are configured to provide incident light of a different wavelength and/or polarization state, or
  ii) the one or more detection devices are configured to detect scattered light of a different polarization state;
wherein the imaging apparatus further comprises a processor in data communication with the one or more detection devices and the processor is configured to determine the chemical and/or material specific information of the sample based on a change in intensity of the elastic scattering component in dependence of at least one of a change in wavelength of the incident light and/or the scattered light or a change in polarization state of the incident light and/or the scattered light;
wherein the one or more illumination devices comprise a scanning element and an illumination objective, wherein the scanning element and illumination objective are configured to illuminate the sample with a light sheet of the incident light; and
the one or more detection devices are configured to detect the at least two images by imaging the light sheet at an angle to a plane of the light sheet.

16. The imaging apparatus of claim 15, wherein the one or more illumination devices comprise
a tunable wavelength light source, or
two or more light sources, each configured to emit light of a different wavelength, or
a light source configured to emit light at a plurality of wavelengths.

17. The imaging apparatus of claim 15, wherein the one or more illumination devices comprise a polarization changing optical component, optionally a tunable polarizer, or two or more polarizers.

18. The imaging apparatus of claim 15, wherein the one or more detection devices comprise a plurality of detection devices, each of the plurality of detection devices is configured to detect scattered light of a different polarization state and/or wavelength.

19. The imaging apparatus of claim 15, wherein the one or more detection devices comprise a polarization changing optical component.

20. The imaging apparatus of claim 15, wherein the one or more illumination devices comprise focusing optical elements in an illumination path, the focusing optical elements being configured to allow focusing of an incident beam substantially without chromatic aberration for wavelengths in a range of 350-30000 nm.

* * * * *